J. F. O'CONNOR.
UNIVERSAL JOINT FOR SHAFTING.
APPLICATION FILED APR. 3, 1919.
1,314,015.
Patented Aug. 26, 1919.
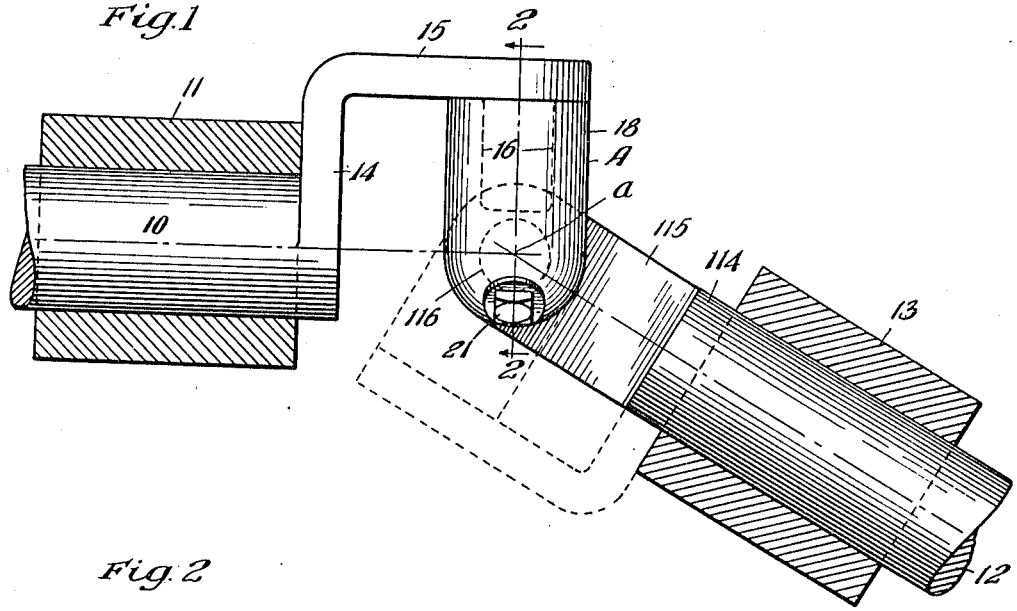
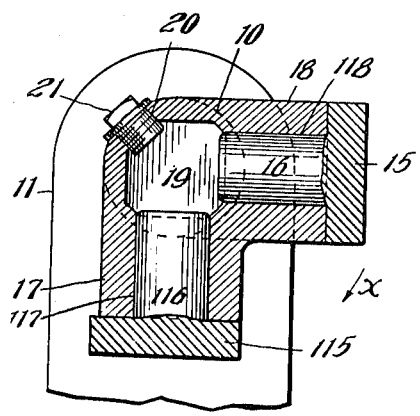
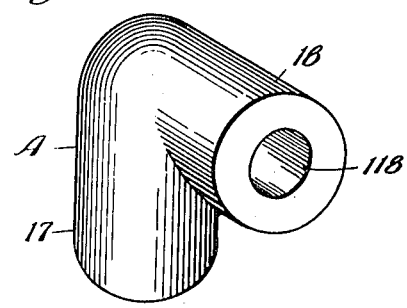
WITNESSES:
Wm. Geiger
INVENTOR.
John F. O'Connor
BY George J. Haight
his ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

UNIVERSAL JOINT FOR SHAFTING.

1,314,015.      Specification of Letters Patent.      Patented Aug. 26, 1919.

Application filed April 3, 1919. Serial No. 287,169.

*To all whom it may concern:*

Be it known that I, JOHN F. O'CONNOR, a citizen of the United States, residing at Chicago, in the county of Cook and State of Illinois, have invented a certain new and useful Improvement in Universal Joints for Shafting, of which the following is a full, clear, concise, and exact description, reference being had to the accompanying drawings, forming a part of this specification.

This invention relates to improvements in universal joints for shafting.

One object of the invention is to provide an exceedingly simple, inexpensive universal joint for transmitting power between shafts arranged at an angle to each other.

Another and more specific object of the invention is to provide a single-piece universal joint for transmitting power between shafts arranged at an angle to each other.

In the drawings forming a part of this specification, Figure 1 is a part sectional view, part plan view, illustrating my invention in connection with two shafts arranged at an angle to each other. Fig. 2 is a sectional view taken substantially on the line 2—2 of Fig. 1. And Fig. 3 is a detail perspective of the universal joint, detached.

In said drawings, 10 denotes a portion of a driving shaft mounted in a suitable bearing 11, and 12 indicates a portion of a shaft to be driven, the same being mounted in a corresponding suitable bearing 13. As clearly disclosed in the drawing, the shafts 10 and 12 are arranged at an angle to each other, which, of course, may be varied, and the axes of rotation of said shafts 10 and 12, projected, intersect at a point indicated at *a*.

In carrying out my invention, I provide the driving shaft 10 with a suitable arm 14 extending perpendicular to the axis of rotation thereof and adapted to bear against the bearing 11 and prevent movement of the shaft 10 in a direction to the left, as viewed in the drawing. The arm 14 is extended for a distance parallel to the axis of the shaft 10, but at one side thereof as indicated at 15. Near the outer end of the portion 15 of said arm, is formed an inwardly or radially extending bearing pin 16, the center or axis of which, when projected, would pass through the point *a*.

The shaft 12 is or may be provided at its end with a corresponding arm 114 having an extension 115 offset from the axis of the shaft but extending parallel thereto, the extension 115 having also a radially extending bearing pin 116 the axis of which, when projected, passes through the point *a*.

In order to transmit power from the shaft 10 to the shaft 12, I provide the single-piece universal joint designated generally by the reference A. As shown, this may be in the form of a casting having two legs 17 and 18 at right angles to each other, said legs 17 and 18 being bored as indicated at 117 and 118 to receive the journal pins 16 and 116 as indicated by the sectional view in Fig. 2. The journal pins 16 and 116 carried by the shafts are extended to or slightly into a recess 19 formed in the member A as shown in Fig. 2. The recess A is used to contain oil or other lubricant conveniently admitted through an opening 20 that may be sealed by a set screw 21. With this arrangement, it is evident that the bearing between the pins 16 and 116 and the member A may be constantly lubricated and wear thereby minimized.

In operation, the shaft 10 will be rotated in the direction indicated by the arrow *x* in Fig. 2. The bearing pin 16 carried by the shaft 10 will of course rotate in a plane perpendicular to the axis of rotation of the shaft 10 and the arm 18 of the member A will rotate in the same plane. Correspondingly, the bearing pin 116 carried by the driven shaft 12 will rotate in a plane perpendicular to the axis of rotation of the shaft 12, and the arm 17 of the member A will rotate in the same plane. These two planes of rotation, of course, intersect at the point *a* thereby permitting the successful operation of the universal joint. The dotted lines in Fig. 1 indicate the position of the shaft 12 rotated 90° from the position indicated by the full lines.

Although I have herein shown and described what I now consider the preferred manner of carrying out my invention, it is evident that the same is merely illustrative since various changes may be made without departing from the spirit of the invention, particularly with respect to the details of construction forming the supports for the journal pins 16 and 116.

I claim:

1. As an article of manufacture, a single-piece universal joint for transmitting power between shafts having an angular relation, said joint having two arms at right angles to each other, each arm being provided with a portion adapted to provide a swivel connection with its respective shaft, the axes of the swivel connections extending at right angles to the axes of the respective shafts and the projected intersection of the axes of said swiveled connections coinciding with the projected intersection of the axes of the shafts.

2. As an article of manufacture, a single-piece universal joint for transmitting power between shafts having an angular relation, said joint having two arms at right angles to each other, each of said arms being bored inwardly from its outer end toward the angle of the joint, the bores providing bearings for pins carried by the shafts between which power is to be transmitted.

3. In a power-transmitting mechanism of the character described, the combination with two shafts arranged at an angle to each other and with the axes of rotation adapted to intersect at a point between the shafts, when projected, of a joint having two arms arranged at right angles to each other, the angle of the joint coinciding with said projected intersection of the axes of the shafts, and means providing a swivel connection between each arm of said joint and the shafts, the axes of said swiveled connections, when projected, intersecting at said projected point of intersection of the axes of the shafts.

4. As an article of manufacture, a single-piece universal joint for transmitting power between shafts having an angular relation, said joint comprising two arms arranged at right angles to each other, each arm being bored from its outer end, said joint having a cavity at the angle thereof adapted to serve as a receptacle for a lubricant, said bores opening into said recess.

5. In a power-transmitting mechanism of the character described, the combination with two shafts arranged at an angle and mounted in bearings, the axes of rotation of said shafts, when projected, intersecting, of radially extending bearing pins carried by said shafts and each located to one side of the respective axis of rotation thereof, the axes of said pins, when projected, intersecting at said intersection of the axes of the shafts, and a universal joint having a pair of angularly arranged arms, said arms being provided with bearings to accommodate said pins.

In witness that I claim the foregoing I have hereunto subscribed my name this 29th day of March 1919.

JOHN F. O'CONNOR.